United States Patent
Teng et al.

(10) Patent No.: US 10,021,070 B2
(45) Date of Patent: Jul. 10, 2018

(54) METHOD AND APPARATUS FOR FEDERATED FIREWALL SECURITY

(71) Applicant: CISCO TECHNOLOGY, INC., San Jose, CA (US)

(72) Inventors: Jin Teng, Sunnyvale, CA (US); Subharthi Paul, Fremont, CA (US); Thilan Niroshaka Ganegedara, Milpitas, CA (US); Xun Wang, San Jose, CA (US); Saman Taghavi Zargar, San Jose, CA (US); Jayaraman Iyer, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 182 days.

(21) Appl. No.: 14/979,042

(22) Filed: Dec. 22, 2015

(65) Prior Publication Data

US 2017/0180316 A1 Jun. 22, 2017

(51) Int. Cl.
*G06F 17/00* (2006.01)
*H04L 29/06* (2006.01)
*G06F 17/30* (2006.01)

(52) U.S. Cl.
CPC .... *H04L 63/0227* (2013.01); *G06F 17/30377* (2013.01); *H04L 63/0218* (2013.01); *H04L 63/105* (2013.01)

(58) Field of Classification Search
CPC . H04L 63/0227; H04L 63/1433; H04L 63/20; G06F 17/3037
See application file for complete search history.

(56) References Cited

U.S. PATENT DOCUMENTS

| | | | |
|---|---|---|---|
| 7,076,650 B1 * | 7/2006 | Sonnenberg | H04L 63/0227 713/151 |
| 8,037,178 B1 * | 10/2011 | Agarwalla | G06F 9/5072 709/225 |
| 8,065,393 B2 | 11/2011 | Balasubramaniam Chandra et al. | |
| 8,462,780 B2 * | 6/2013 | Vincent | H04L 12/4633 370/343 |
| 8,612,744 B2 * | 12/2013 | Shieh | H04L 63/0218 713/153 |
| 9,325,732 B1 * | 4/2016 | Stickle | H04L 63/1441 |
| 2002/0162026 A1 * | 10/2002 | Neuman | H04L 63/0227 726/4 |

(Continued)

OTHER PUBLICATIONS

Ioannidis, Sotiris, et al. "Implementing a distributed firewall." Proceedings of the 7th ACM conference on Computer and communications security. ACM, 2000.

Charles Payne,Tom Markham."Architecture and applications for a distributed embedded firewall." Computer Security Applications Conference,2001.ACSAC 2001. 17th Annual IEEE, 2001.

(Continued)

*Primary Examiner* — Techane Gergiso
(74) *Attorney, Agent, or Firm* — Cindy Kaplan (57) ABSTRACT

In one embodiment, a method includes receiving capability information from an end host at a centralized security matrix in communication with a firewall and a plurality of end hosts, verifying at the centralized security matrix, a trust level of the end host, assigning at the centralized security matrix, a firewall function to the end host based on the trust level and capability information, and notifying the firewall of the firewall function assigned to the end host. Firewall functions are offloaded from the firewall to the end hosts by the centralized security matrix. An apparatus and logic are also disclosed herein.

20 Claims, 5 Drawing Sheets

(56) References Cited

U.S. PATENT DOCUMENTS

| | | | |
|---|---|---|---|
| 2003/0172294 A1* | 9/2003 | Judge | G06F 21/554 726/13 |
| 2005/0108518 A1* | 5/2005 | Pandya | H04L 63/0485 713/151 |
| 2006/0179296 A1* | 8/2006 | Bartlett | H04L 63/0218 713/152 |
| 2006/0195896 A1* | 8/2006 | Fulp | H04L 63/0218 726/11 |
| 2007/0180513 A1* | 8/2007 | Raz | H04L 29/12481 726/12 |
| 2007/0255861 A1* | 11/2007 | Kain | H04L 63/029 710/8 |
| 2009/0199290 A1* | 8/2009 | McCullough | H04L 63/0272 726/12 |
| 2009/0204964 A1* | 8/2009 | Foley | G06F 21/53 718/1 |
| 2011/0078320 A1 | 3/2011 | Grayson et al. | |
| 2013/0111211 A1* | 5/2013 | Winslow | H04L 9/3234 713/171 |
| 2013/0219175 A1* | 8/2013 | Gearhart | H04L 63/0485 713/160 |
| 2015/0295831 A1 | 10/2015 | Kumar et al. | |
| 2017/0163644 A1* | 6/2017 | Horii | H04L 63/10 |

OTHER PUBLICATIONS

Al-Shaer, Ehab S., et al"Discovery of policy anomalies in distributed firewalls." INFOCOM 2004. 23rd Annual Joint Conference IEEE Computer and Comm Societies.vol. 4. IEEE, 2004.

Y., Wang, and M., Singh, "Formal Trust Model for Multiagent Systems", IJCAI'07 Proceedings of the 20th international joint conference on Artifical intelligence.

A., Aref, and T., Tran, "A Trust Establishment Model in Multi-Agent Systems", Incentive and Trust in E-Communities: Papers from the 2015 AAAI Workshop.

B. Khosravifar, et al Maintenance-based Trust for Multi-Agent Systems,AAMAS '09 8th International Conference on Autonomous Agents and Multiagent Systems—vol. 2.

Sabater, Jordi, and Caries Sierra. "Review on computational trust and reputation models." Artificial intelligence review 24.1 (2005): 33-60.

Lamport, L, "The Part-Time Parliament," ACM Transactions on Computer Systems 16(2), pp. 133-169, May 1998.

https://software.intel.com/sites/default/files/article/413936/hasp-2013-innovative-instructions-and-software-model-for-isolated-execution.pdf.

Tennenhouse et al., "A Survey of Active Network Research", IEEE Communications Magazine, pp. 80-86, Jan. 1997.

* cited by examiner

METHOD AND APPARATUS FOR FEDERATED FIREWALL SECURITY

TECHNICAL FIELD

The present disclosure relates generally to communication networks, and more particularly, to network security.

BACKGROUND

Network security devices such as firewalls provide advanced security by applying security policies to network traffic flowing through the network security devices. Corporations often rely on firewalls to protect their network perimeters. With the advent of the Next Generation Firewall (NGFW), inspection and detection capability of the firewall is greatly enhanced. While these enhanced inspection capabilities greatly improve the effectiveness of these devices against a much broader spectrum of cyber-security attacks than their predecessors, it comes with increased computational and memory costs.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises receiving capability information from an end host at a centralized security matrix in communication with a firewall and a plurality of end hosts, verifying trust level of the end host, assigning a firewall function to the end host based on the trust level and capability information, and notifying the firewall of the firewall function assigned to the end host. Firewall functions are offloaded from the firewall to the end hosts by the centralized security matrix.

In another embodiment, an apparatus generally comprises an interface for communication with a firewall and a plurality of end hosts, a database for storing a plurality of security policies at a centralized security matrix, and a processor for processing capability information received from the end hosts, verifying trust levels of the end hosts, assigning firewall functions to the end hosts based on the trust levels and capability information, and notifying the firewall of the firewall functions assigned to the end hosts to offload the firewall functions from the firewall to the end hosts.

In yet another embodiment, logic is encoded on one or more non-transitory computer readable media for execution and when executed operable to transmit capability information from an end host to a centralized security matrix in a federated firewall security system, process instructions received from the centralized security matrix to perform a firewall function, perform the firewall function on network traffic received at the end host, wherein the firewall function is offloaded from a firewall in the federated firewall security system to the end host, and transmit traffic inspection results from the end host to the centralized security matrix.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Firewalls are used to protect networks through inspection and detection of protocol and networking anomalies, and enforcement of security policies, such as access control. The conventional concept of firewalling, in which a single physical or virtual device performs firewall operations, has limited effectiveness because it is a point solution and operates only at a network perimeter. Firewalls may be distributed and located at important network positions, but may not work in a networked fashion. For example, with conventional firewalls, even if the firewalls receive security updates from a central database (e.g., malware signature database), their basic inspection and enforcement functions are still performed almost entirely within the firewall. There are a number of drawbacks with this approach. For example, firewalls are slow as compared to other networking devices and need to perform far more computations to handle all kinds of evolving cyber-attacks. With the advent of Next Generation Firewalls (NFGWs), this problem becomes more serious since more computing resources are consumed than with traditional firewall operations. Firewalls may not have enough computing resources and become a bottleneck in the network. A cluster of NGFWs may address this issue, however, the cost of deploying an NGFW cluster may be prohibitive, especially since for typical enterprise traffic a cluster provisioned to handle a worst-case attack scenario would likely have low average utilization. Also, modern cyber-attacks may be very large scale. For example, massive Distributed Denial of Service (DDoS) attacks may leverage millions of infected computers in order to attack a corporate website. Several firewalls within a corporation, no matter how fast they are, cannot effectively detect and stop these attack flows.

Although firewalls stand at crucial networking locations, they may not be the best device to carry out traditional firewalling functionalities. For example, firewalls may see all of the in-bound and out-bound traffic, however, the firewalls are blind as to the context of the traffic that they see. The firewalls do not retain enough per-host state information to know the full context of an end point's behavior or maintain enough state information for correlation analytics across all hosts in the network, which is also computationally expensive. Thus, the firewall's privilege to see all traffic is largely wasted. Also, conventional firewalls located on network edges perform perimeter traffic control, but fail to identify threats generated from inside of a network. The firewall is not only unable to detect internal threats, but also unable to defend against them.

Another drawback with conventional firewalls is that end-to-end encryption, which is being used more often, severely limits what a firewall can inspect. If the firewall decrypts and inspects the traffic, it would create a huge performance impact.

While conventional firewalls often lack scalability and effectiveness, many resources within the network (e.g., end hosts, third party security devices) are not systematically organized and their capabilities are often wasted due to redundancy. Conventional end hosts are relatively weak in their capability to defend against cyber-attacks and their resources are often not completely utilized. Any checks that the end host performs may be redundant checks that the firewall has already done.

With the growing use of network analytics, there is also a need for automatic input to the firewall or other security devices in a seamless fashion. Manual involvement and configuration based on knowledge gained from network analytics is still the main approach adopted by many corporations.

As described in detail below, aspects of the present disclosure overcome one or more of the drawbacks related to conventional firewalling.

The embodiments described herein provide federated firewall security, which allows for distributed firewall functionality. In one or more embodiments, a security command center (referred to herein as a centralized security matrix) is used to communicate with agents installed in end hosts to push selected inspections and traffic rules down to the end hosts. The security matrix may also collect security information from agents and act on the information collected. Local security capabilities may be leveraged by offloading firewall computations (e.g., inspections), collecting intelligence, and enforcing rules at optimum locations within the network.

The embodiments allow the network to act as a whole to deal with sophisticated or massive attacks more efficiently than a single firewall or a single piece of anti-virus software. This allows firewall functions to run at a much higher speed and perform thorough inspections at optimum locations. Furthermore, both outside threats and inside threats may be effectively blocked or checked. One or more embodiments of the federated firewall security system overcome drawbacks of conventional systems, including insufficient computing power on firewalls and limited visibility into traffic on firewalls.

Figure 1:
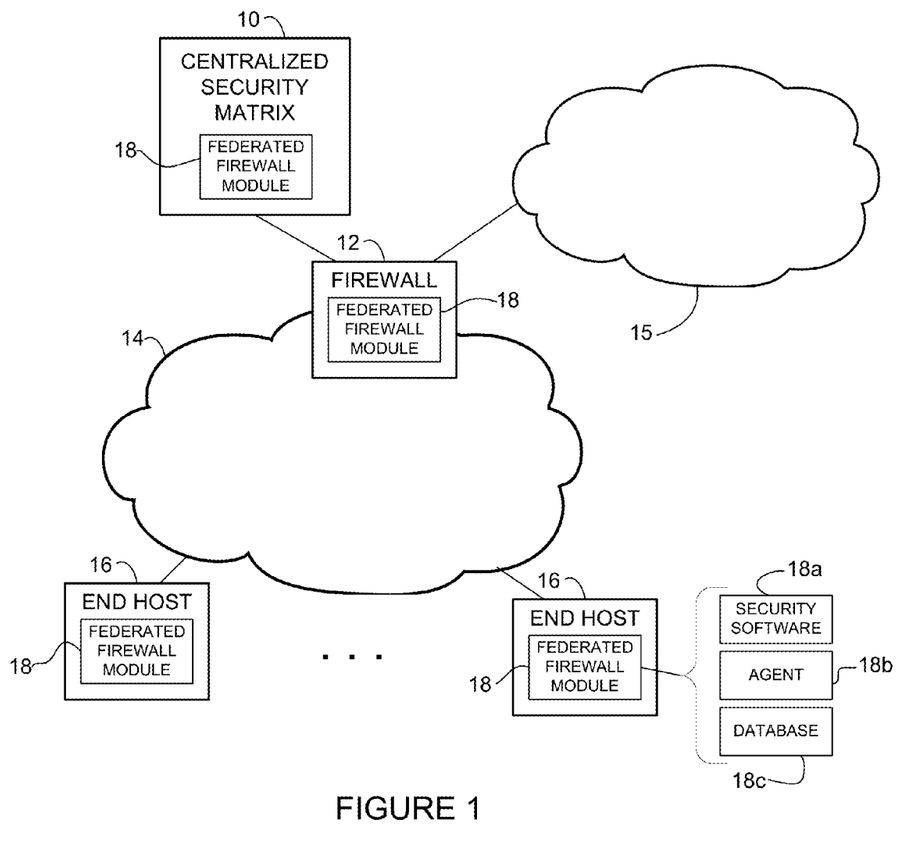
FIG. 1 illustrates an example of a network in which embodiments described herein may be implemented.

Referring now to the drawings, and first to FIG. 1, a simplified network in which embodiments described herein may be implemented is shown. The embodiments operate in the context of a data communication network including multiple network devices. The network may include any number of network devices in communication via any number of nodes (e.g., routers, switches, gateways, controllers, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, Internet, intranet, radio access network, public switched network, or any other network). In one embodiment, the network comprises an enterprise network comprising a plurality of end hosts located behind a perimeter firewall or connected to the enterprise network through a VPN.

The network shown in the example of FIG. 1 includes a centralized security matrix 10 in communication with a firewall 12. The firewall 12 is located at an edge of a network 14 (e.g., corporate or enterprise network) comprising a plurality of end hosts 16 (hosts, end points, clients, stations, or other network devices). The security matrix 10 may communicate with the end hosts 16 via any number or type of network devices (e.g., firewall, router, switch, and the like). The security matrix 10 may also be in communication with one or more other firewalls 12 or networks 14, or a centralized security matrix 10 in another domain, as described below. The firewall 12 may be in communication with any number of networks 15. The network 14 may include any number of end hosts 16. All or a portion of the end hosts 16 may be operable to perform firewall functions offloaded from the firewall 12.

As described in detail below, the security matrix 10 coordinates security related activities (e.g., firewalling activities including inspection and enforcement) across the network. The security matrix 10 is the security command center in a federated firewall framework and is operable to distribute individual firewall functions to offload any number of firewall functions from the firewall 12 to one or more of the end hosts 16. The security matrix 10 may also collect security information (e.g., inspection results, traffic rules) from the end hosts 16 or other security devices and propagate this information to relevant hosts as needed.

The term "firewall" as used herein refers to a firewall device positioned in the network to perform firewall functions. The term "firewall function" as used herein refers to a logical function or service that may be performed at various network devices. The term "federated firewall" as used herein refers to the collaboration of individual firewall functions performed at various network devices (e.g., firewall, security device, end host) and coordinated by the security matrix 10. Selected firewall functions are offloaded from the firewall 12 to selected end hosts 16 by the security matrix 10 to provide scalability, optimization, and improved effectiveness against large scale or sophisticated attacks from threats internal or external to the network.

In one embodiment, the security matrix 10 functions as a context-aware (dynamic load, configuration, capability, trust, etc.) intelligent scheduler that optimizes the distribution of security functions across multiple security devices and end hosts 16, which enables reprogramming of security functions. The security matrix 10 may gather information about resources within a network and build up a coordinated security domain, which is referred to herein as intelligent and organized federated firewalling. The federated firewall security system comprises firewall functionality distributed in a coordinated fashion across one or more physical or virtual firewalls 12 and end points 16. In one embodiment, the firewall functionality is distributed into a computing fog covering all network devices. The federated firewall security system views the firewall as a set of logical functions/services, distributes these functions to where they would be able to most effectively perform their tasks, and has these individual firewall function instances collaborate to provide the abstraction of a single large firewall. The different instances of the same functional piece may have separate contexts. For example, each instance of an end host inspection function in the federated firewall may have the context associated with the particular end host on which it is deployed.

The security matrix 10 may operate at a controller, server, appliance, or any other network element or general purpose computing device located in a network or in a cloud or fog environment. In certain embodiments, the security matrix 10 is located at a choke (focal) point that all traffic passes, both internal and external. In one embodiment, the security matrix 10 is located at the firewall 12. This location may be beneficial since the firewall 12 is a major security device and contains security information. Placement of the security matrix 10 at the firewall 12 is therefore conducive to information gathering and consumption needs of the matrix. Moreover, placement at the firewall 12 allows the security matrix 10 to receive protection from the firewall, conveniently reach any networking device, and see all inbound and outbound traffic. The security matrix 10 may also be distributed among any number of network devices (e.g., firewalls 12, end hosts, 16, security devices, or other network devices).

As previously described, the security matrix 10 may offload one or more firewall functions from the firewall 12 to one or more end hosts 16. The offloaded firewall functions may be different for each end host, based on trust level and capabilities of the end host. Offloaded firewall functions may include, for example, encrypted traffic inspections, HTTP (Hypertext Transfer Protocol) inspections, or any other inspections (e.g., ICMP (Internet Control Message Protocol), DNS (Domain Name System), VxLAN (Virtual Extensible Local Area Network), FTP (File Transfer Protocol), SMTP (Simple Mail Transfer Protocol), and the like), or traffic policing. Traffic throttling may also be offloaded to end hosts 16 and monitored by the firewall 12 without a trusted computing infrastructure, as described below. It should be noted that these are only examples of firewall functions that may be offloaded from the firewall 12 to one or more end hosts 16. The security matrix 10 may coordinate which functions are performed on which devices. Decisions may be based on trust level of the end host 16 or optimization of resources (e.g., processing, memory, bandwidth), or any other factor or combination thereof.

The firewall 12 may be any firewall device, NGFW (Next Generation Firewall) device, or other network device that is positioned in the network to perform firewall functions. The firewall 12 may comprise an appliance, server, or any other physical or virtual network element. In certain embodiments, the firewall 12 is located on a network edge and serves as a focal point for in-bound network traffic (e.g., IP (Internet Protocol) data packets) flowing between the end hosts 16 and other networks 15, and from the networks to the end hosts 16.

The end host 16 may comprise an entity or instance that may implement network security policies, such as any physical device or hardware, virtual device or virtual machine, computer, software, application, or service configured to implement network security policies in connection with the network traffic. The end host 16 may comprise, for example, a server, virtual machine, desktop computer, laptop computer, appliance, mobile phone, tablet, personal digital assistant, or any other device in communication with the firewall 12. The end host 16 may be a managed or unmanaged device. For example, a user may attempt to access the network from a corporate-managed personal computer, personal network-accessible device, or public terminal. The end host 16 may be a wired device or wireless device, or configured for both wired communication (e.g., connected to a docking station) and wireless communication. The end host 16 may also comprise a switch, router, load balancer, or security appliance (e.g., IPS (Intrusion Protection System), WAF (Web Application Firewall)), or other middle-box or network appliance. Thus, the term "end host" as used herein may refer to any network device including endpoints, intermediate nodes (e.g., operating as extensions to endpoints), or any other network device operable to communicate with the security matrix 10 and perform federated firewall operations.

Traffic inspections performed at the end host 16 may result in security information (e.g., traffic policing rules), due to a better visibility to the traffic targeted to the end host, that may be sent back to the firewall 12, which may then enforce those rules. An example of security information is what IP nodes are issuing attacks on a certain host and what kind of attacks (either from internal network or external network). The firewall 12 or other security device may also push traffic policing rules into the network and have them enforced as close as possible to the source, thus providing efficient restriction or blocking of harmful or illegitimate traffic that would have been restricted or blocked at a later stage, thereby saving resources (e.g., processing, bandwidth).

As shown in FIG. 1, the firewall 12 and end hosts 16 may each comprise a federated firewall module 18 operable to receive inspection or traffic rules or policies from the security matrix 10 and perform security operations (e.g., traffic inspection (inbound, outbound), traffic policing, threat detection, threat prevention). In one or more embodiments, the federated firewall module 18 comprises local security software 18a (e.g., local anti-virus, anti-malware, firewall), which performs partial or complete firewall functions, an agent 18b, which facilitates communication between the security matrix 10 and local security software, and local security database 18c. The agent 18b is responsible for communications between the security matrix 10 and firewall 12 and end hosts 16. The agent 18b may, for example, report security capabilities of the local security software to the security matrix 10 and push down the security policies or offload computation tasks from the firewall 12 and leverage the local software 18b to carry out firewalling capabilities. The agent 18b may also supply locally generated security information to the security matrix 10. As described below, the databases 18c at the security matrix 10, firewall 12, and end hosts 16 may form a distributed database. In the example shown in FIG. 1, the federated firewall security system comprises the centralized security matrix 10 and federated firewall modules 18 (e.g., local security software 18a, agents 18b, local security databases 18c) located at the firewall 12 and end hosts 16. Coordination among the firewall 12 and agents 18b by the security matrix 10 in the federated firewall security system may provide improved intelligence gathering and policy enforcement.

In one embodiment, the agent 18b may provide an API (Application Programming Interface) to allow various types of security software to communicate with the security matrix 10. Data analytics may, for example, inform the security matrix 10 of identified security threats and request the matrix to enforce the required traffic rules. The agent 18b operates as a collaborative agent and works with the firewall 12 to provide security information and enforce security policies. In one embodiment, the agent 18b may use a platform such as Cisco AnyConnect or other security mobility client. As described further below, the agent 18b is preferably built deep into the operating system of the end host 16, or even underlie the entire operating system, as it will likely touch many core functions of the operating system. The agent 18b is also preferably robust and able to withstand attacks, even if the attackers obtain a root privilege. In one or more embodiments, trusted computing may be used to achieve these goals.

As described in detail below, the federated firewall security system may comprise one or more mechanisms to ensure trust of the end hosts 16 or security devices. Trust is needed to ensure that the end hosts 16 or other security devices provide truthful information to the security matrix 10 and honor all of their commitments to the matrix to perform operations (e.g., inspecting certain traffic). In certain embodiments, the matrix 10 and agents 18b may be authenticated (e.g., at an Authentication, Authorization, and Accounting (AAA) server) and traffic encrypted to provide both confidentiality and authentication. Different trust levels may be assigned to end hosts 16. For example, after verifying the trust level of the end host 16, the security matrix 10 may assign a trust level to the end host (e.g., fully trusted, partially trusted, untrusted, trusted with respect to certain inspections, etc.). Firewall functions may still be assigned to untrusted devices. For example, untrusted devices may perform filtering rules related to the host itself or apply only deny rules and not permit rules. Examples of trusted computing are described further below.

In one embodiment, the federated firewall security system utilizes a distributed database comprising local databases 18c at firewall 12 and end hosts 16, to provide a single logical view of all of the security policies, consistency of the policies, redundancy of the policies (e.g., replication and backups in case of failure at one or more nodes), and authorization and management of security policies. The distributed database may be configured, for example, to provide full or partial properties of ACID (atomicity, consistency, isolation, durability, and redundancy). Local security databases may be updated periodically or upon request. In one embodiment, an SQL (Structured Query Language) (or similar language) may be used to configure the distributed database. Data is preferably stored as local as possible to improve performance. For example, data may be transferred or replicated only upon request. Updates may be provided to synchronize the local databases with a security database at the centralized security matrix 10. In certain embodiments, all network rules may be entered as database entries. An open framework may be provided for third party participation. The distributed database may also operate with SDN (Software Defined Networks).

The example shown in FIG. 1 includes a single domain with one security matrix 10. In large scale networks comprising multiple domains, two or more security matrices 10 may communicate with each other. This may enable firewall alliances and secure a wider networking area. In one example, a network of federated firewall security systems may handle DDoS (Distributed Denial of Service) attacks.

In certain embodiments, inter-matrix communications may be performed by inserting an agent 18b from one security matrix 10 into another security matrix. It should be noted that caution should be taken to ensure that the identities of both matrices are genuine and valid. Also some high level control algorithms may be needed to ensure that the coordinated network efforts unfold in a convergent way.

In one embodiment utilizing inter-matrix communications, hierarchical matrices may be formed (e.g., in a corporation). For example, there may be a major matrix at one location and sub-matrices at other crucial positions within the corporation. This is especially useful for virtual deployments, where a virtual matrix may be easily added or removed.

It is to be understood that the network devices and topology shown in FIG. 1 and described above is only an example and the embodiments described herein may be implemented in networks comprising different network topologies or network devices, or using different protocols or languages, without departing from the scope of the embodiments. For example, the network may include any number or type of network devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, accelerators, virtual machines, switches, routers, appliances, controllers, or other nodes interconnected to form a large and complex network, which may include cloud or fog computing. Nodes may be coupled to other nodes through one or more interfaces employing any suitable wired or wireless connection, which provides a viable pathway for electronic communications.

Figure 2:
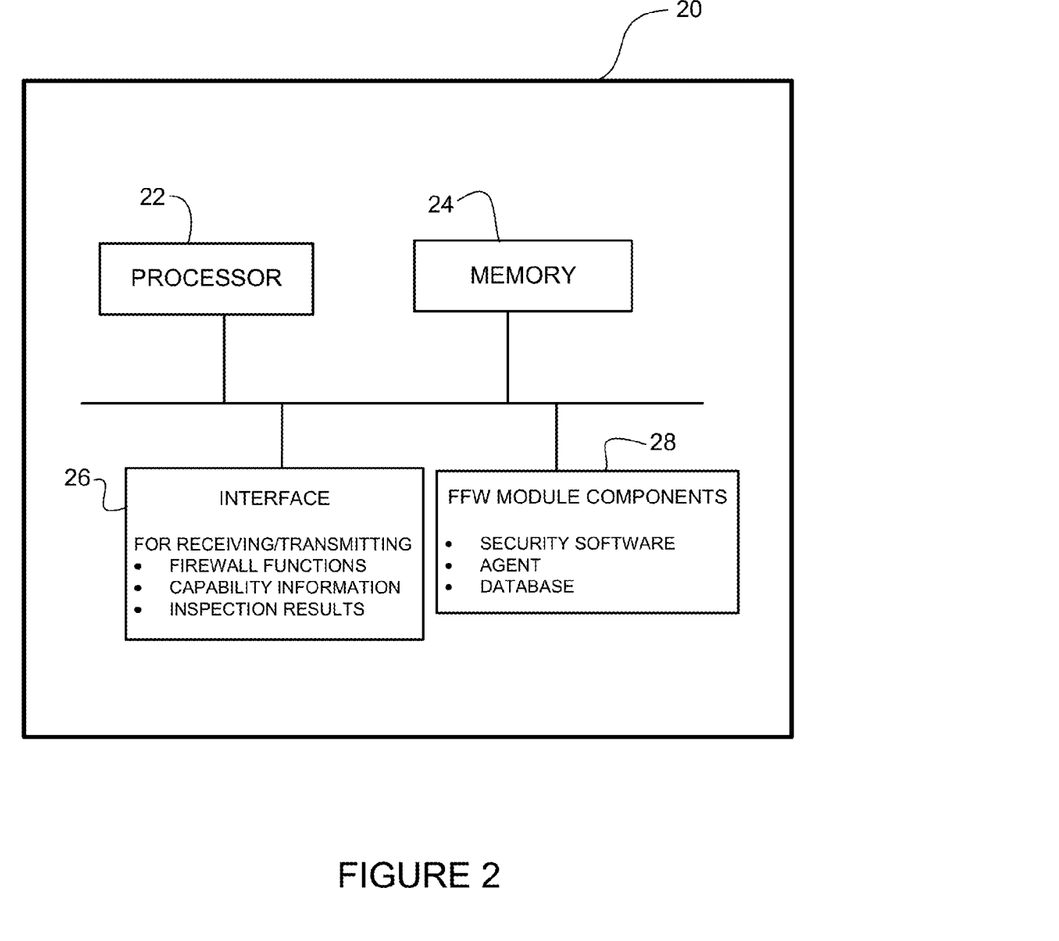
FIG. 2 depicts an example of a network device useful in implementing embodiments described herein.

FIG. 2 illustrates an example of a network device 20 (e.g., centralized security matrix 10, firewall 12, end host 16 in FIG. 1) that may be used to implement the embodiments described herein. In one embodiment, the network device 20 is a programmable machine that may be implemented in hardware, software, or any combination thereof. The network device 20 includes one or more processor 22, memory 24, network interface 26, and federated firewall components 28 (e.g., security software, agent, database)

Memory 24 may be a volatile memory or non-volatile storage, which stores various applications, operating systems, modules, and data for execution and use by the processor 22. Memory 24 may include, for example, one or more databases (e.g., policy or rules database, threat database, or any other data structure configured for storing data, policies, rules, network data (e.g., host capability information), or other information. As previously described, the database may be part of a distributed database. One or more of the federated firewall module components (e.g., code, logic, software, firmware, etc.) may also be stored in memory 24. The network device 20 may include any number of memory components.

Logic may be encoded in one or more tangible media for execution by the processor 22. The processor 22 may be configured to implement one or more of the functions described herein. For example, the processor 22 may execute codes stored in a computer-readable medium such as memory 24 to perform processes described below with respect to FIGS. 3 and 4. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 20 may include any number of processors 22.

The network interface 26 may comprise any number of interfaces (linecards, ports) for receiving data or transmitting data to other devices. As shown in FIG. 1, the interface provides for communication with the federated firewall security system (e.g., agents 18b in security matrix 10, firewall 12, end host 16). The interface 26 may, for example, receive or transmit firewall functions, capability information, inspection results, or any other security, network, or device information or instructions. As noted above, the security matrix 10 and the firewall 12 may be co-located at the same network device, in which case the interface 26 for communication between the security matrix and firewall would be an internal interface. The network interface 26 may include, for example, an Ethernet interface for connection to a computer or network. The network interface 26 may be configured to transmit or receive data using a variety of different communication protocols. The interface 26 may include mechanical, electrical, and signaling circuitry for communicating data over physical links coupled to the network. As noted above, the end host 16 may comprise an interface configured for wireless communication with the network.

It is to be understood that the network device 20 shown in FIG. 2 and described above is only an example and that different configurations of network devices may be used. For example, the network device 20 may further include any suitable combination of hardware, software, algorithms, processors, devices, components, modules, or elements operable to facilitate the capabilities described herein.

Figure 3:
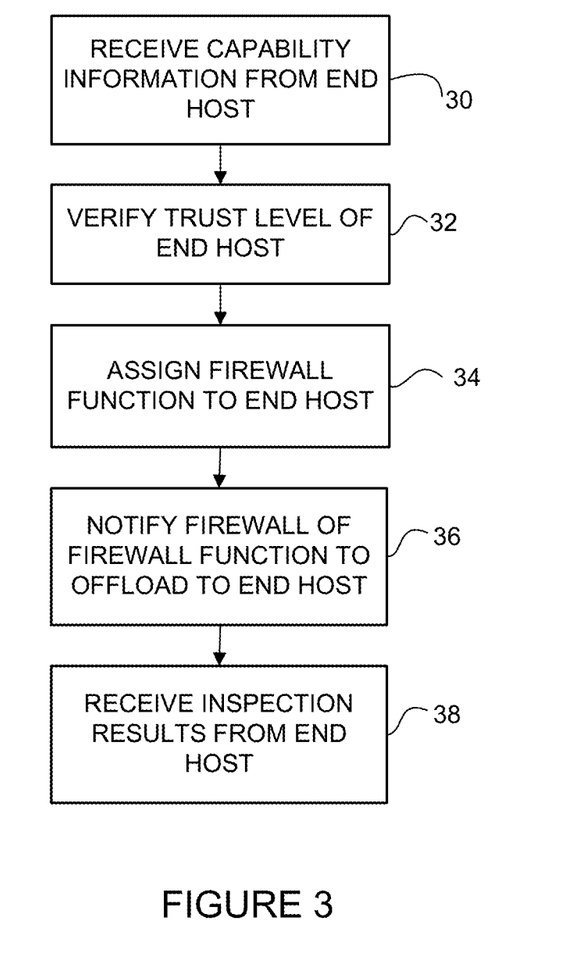
FIG. 3 is a flowchart illustrating an overview of a process for federated firewalling, in accordance with one embodiment.

FIG. 3 is a flowchart illustrating an overview of a process for federated firewalling, in accordance with one embodiment. As shown in FIG. 1, the centralized security matrix 10 is in communication with the firewall 12 and a plurality of end hosts 16 in a federated firewall security system. At step 30, the centralized security matrix 10 receives capability information from one of the end hosts 16 (FIGS. 1 and 3). The capability information may be transmitted during a registration process between the security matrix 10 and end host 16 and may include information about the end host and its capabilities. The information may include, for example, the type of local software installed at the end host (e.g., application, version number) or inspections that the device can perform, resource availability (e.g., processing), or any other information that may be used by the security matrix 10 in its decision to offload firewall functions to the end host 16. The security matrix 10 may also verify a trust level of the end host 16 (step 32). Based on the trust level and capability information of the end host 16 (e.g., local security software and processing capabilities), the security matrix 10 may assign one or more firewall functions to the end host 16 (step 34). The security matrix 10 notifies the firewall of the firewall functions to offload to the end host (step 36). As described below, the firewall function may be completely offloaded from the firewall 12 to the end host 16 or only partially offloaded (e.g., performed at both firewall and end host) depending on the trust level of the end host. The security matrix 10 may also receive inspection results from the end host 16 (step 38) and update policies as needed.

It is to be understood that the process shown in FIG. 3 and described above is only an example and that steps may be added, combined, deleted, or modified without departing from the scope of the embodiments.

Figure 4:
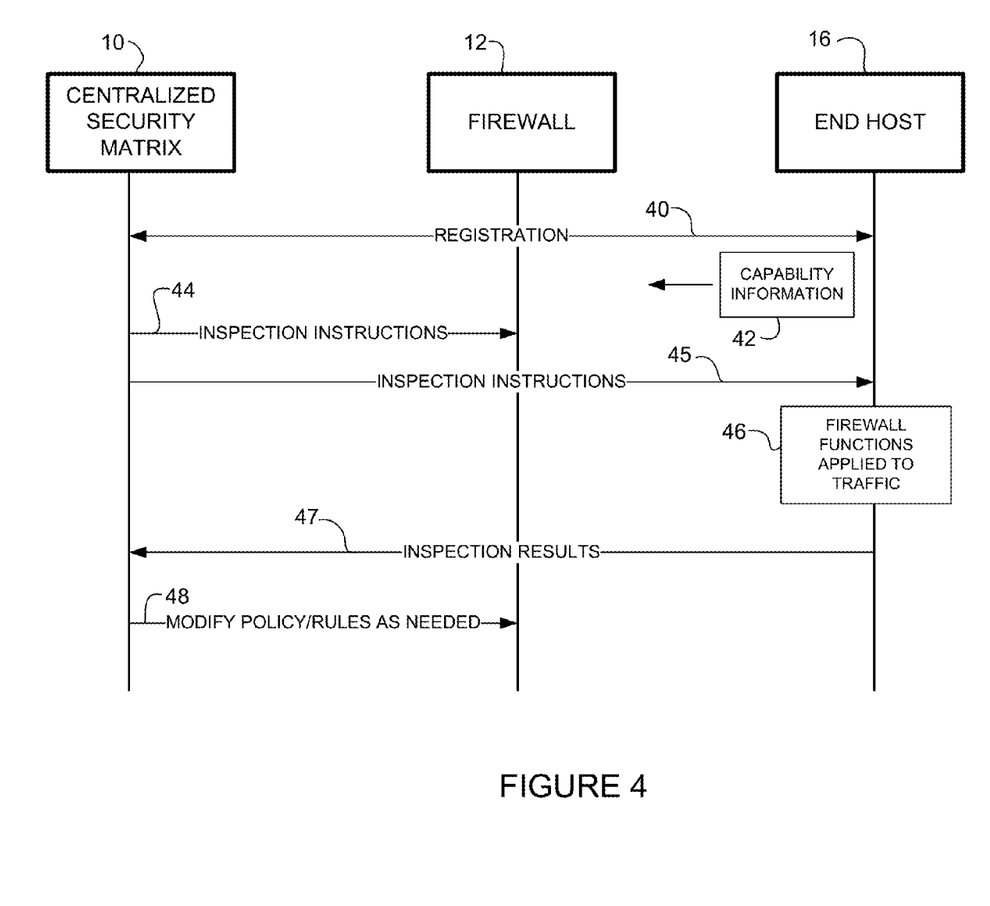
FIG. 4 is a diagram illustrating an overview of communications between network devices in the federated firewall system shown in FIG. 1, in accordance with one embodiment.

FIG. 4 is a diagram illustrating an overview of communications between components of the federated firewall security system shown in FIG. 1, in accordance with one embodiment. When a new end host 16 enters the network, its agent registers the device with the security matrix 10 (40), reporting its basic information and the capabilities of its local security software (42). The registration process may also involve authorization of devices with an AAA server (not shown). The security matrix 10 may perform one or more actions to verify a trust level of the end host 16, as described below. If the device 16 is trusted, capable of performing inspections, and is computationally available, the security matrix 10 informs the firewall 12, which sits on the main entrance point to the internal network, to leave one or more inspections of incoming traffic to the end host 16 (44). The inspection instructions are also transmitted to the end host 16 (45). The end host then inspects traffic and drops malicious packets (46). The end host 16 may optionally send the inspection results back to the security matrix 10 (47), which may adjust the access control policies on the entry firewall 12 (48). The end host 16 may also inspect intranet traffic and if any anomaly is found, the end host 16 may report back to the security matrix 10 so that the security matrix can take action (e.g., pushing rules to relevant internal network devices instructing them to restrict/block traffic).

It may be noted that FIG. 4 describes only the inspection offloading process and there may be other more dynamic information exchanges. For example, the security matrix 10 may send instructions for traffic limiting or access control rules to the end hosts 16 or vice versa. The components may exchange static information (e.g., identity used for authentication, capability information), which does not usually change or changes infrequently. Dynamic information includes various instructions (e.g., ACL (Access Control List), inspection and rate limiting rules) and feedback (e.g., inspection results).

As previously described, the federated firewall security system utilizes trusted computing in order to allow the end host 16 to perform at least some firewall functionality (FIG. 1). Trust means that the security devices and the end hosts would provide truthful information to the security matrix 10. Moreover, the end hosts 16 should honor all promises that they make to the security matrix 10 (e.g., inspecting certain traffic). In addition, the security matrix 10 and agents 18*b* are preferably authenticated and the traffic therebetween may be encrypted to provide both confidentiality and authentication.

In certain embodiments, trust may be provided through validation of the software integrity, validation of the computing results, or a combination thereof.

Validation of software establishes trust by ensuring that the essential software on the device is secure and not tampered with so that the computing results from the software at the end host 16 can be trusted. In one embodiment, checksum may be used on the related software binaries to see if they are altered. This provides a basic protection, and is not difficult for an attacker to break. For absolute tamper-proof properties, hardware based trust guarantees may be used.

Figure 5:
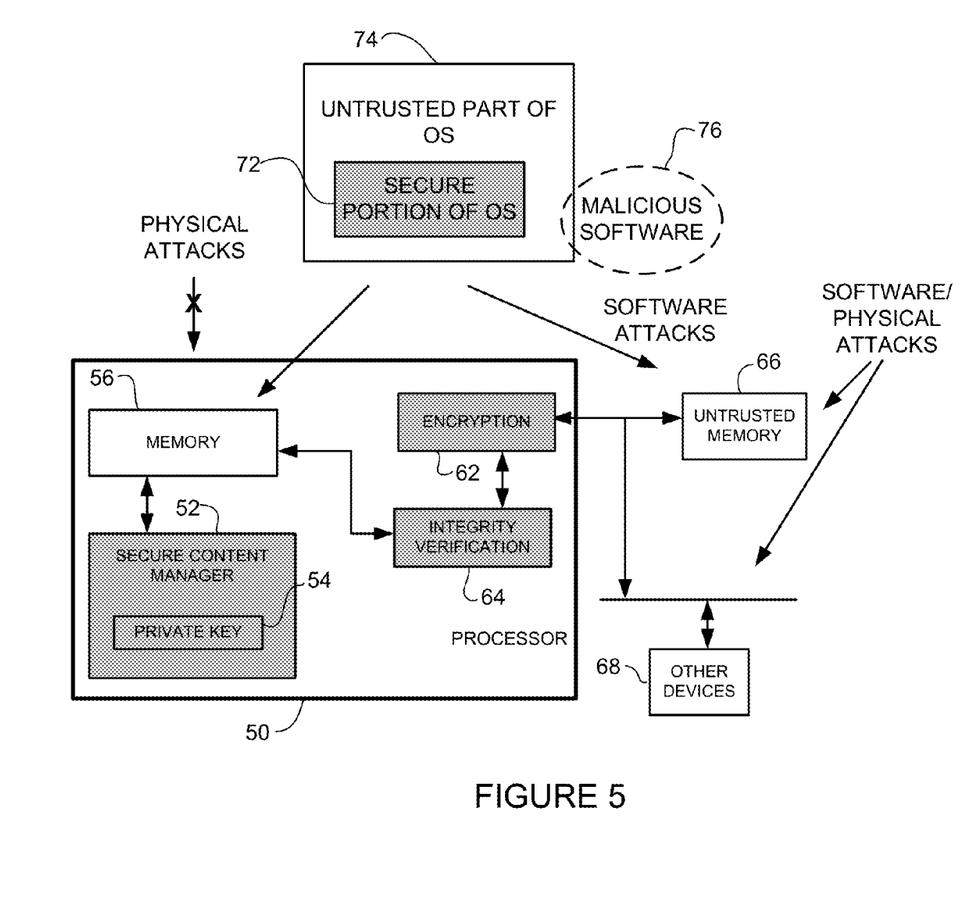
FIG. 5 illustrates an example of a secure processor for use in the federated firewall security system, in accordance with one embodiment.

In order to validate the software integrity, a secure processor may be used, as shown in FIG. 5. In the example shown in FIG. 5, a processor 50 comprises a security content manager 52 with a private key 54. The processor 50 further includes memory 56, encryption module 62, and integrity verification module 64. The system also includes untrusted memory 66 associated with other devices 68 (e.g., input/output devices and memory components (disk)). Secure components of the processor 50 (secure content manager 52, encryption and integrity verification modules 62, 64) operate with a secure portion of the operating system (OS) (e.g., security kernel) 72, which is isolated from an untrusted part of the operating system 74. Malicious software 76 may impact the untrusted part of the operating system 74, without affecting the secure portion of the operating system 72. Thus, physical attacks would not infiltrate the secure processor.

In one example, everything is encrypted with a public key that is off the CPU (Central Processing Unit), including untrusted memory 66 and storage 70. The data and software are only decrypted with the private key 54 when it enters the CPU, and re-encrypted when it has been processed and leaves the CPU. Only the CPU manufacturer knows the private key 54. The basic assumption is that hacking into the CPU or its immediate periphery is difficult, at least not cost efficient, for attackers, as the only place where the plain texts exist is in the CPU. If the vendor only shares the public key to encrypt the software or data with a company, only the company's valid users can install software, and hackers have no chance of reading or altering that software so that the integrity of the software is ensured.

It is to be understood that the secure processor shown in FIG. 5 and described above is only an example of a device for use in trusted computing and that other components and configurations may be used without departing from the scope of the embodiments.

In certain embodiments, validation of the computing results may be used to verify trust. This includes, for example, re-computing or verifying the computing results of less trusted end hosts 16 or security devices by trusted devices, such as the firewall 12. For example, the security matrix 10 may give traffic to different hosts for inspection and then take a majority voting approach on the final results reported by all of the hosts, which provides cross-validation. In order to reduce false positives or false negatives, the hosts 16 may be chosen randomly from a pool of hosts capable of performing the same inspection. For example, three capable hosts may be chosen randomly to perform inspection tasks.

In another example, the security matrix 10 may rely on trusted devices, such as the physical/virtual firewall 12, to re-compute or verify the results. It should be noted that the computing burden needed for verification on the trusted device may be much less than performing the inspection from scratch. If an end host 16 reports to the trusted device 12 that a packet has a match of a malware signature at a specified location, the trusted device may then be used to verify whether or not this is true. This may work well for a positive result (reducing false positives), but not on a negative result (reducing false negatives).

In one or more embodiments implemented in a datacenter or an SDN network, a small firewall or a Linux machine running the agent in front of each VM (Virtual Machine) may be used. In this example, compromise of the VM does not impact operations of a front end machine. In another embodiment, a hypervisor structure on the physical end hosts 16 may be leveraged to ensure integrity of the agent 18b. The real operating system may run as a VM, while the agent runs in the hypervisor, which only personnel with administrative capabilities can modify. Another option is to guarantee the integrity of the local software by the hardware, such that even a compromised root user cannot harm its integrity.

There may be many practical situations in which there is no need to establish trust of the device. For example, there are devices that are intrinsically trustable. Most of the security devices such as firewalls or IPSes (Intrusion Prevention Systems) are safe to trust. By linking all security devices, automatic cooperation is allowed among the devices, which relieves technical/administrative personnel to manually inter-operate among devices (e.g., read off one device and change the configurations of another).

The amount or type of firewall functionality that may be offloaded to an end host 16 may depend on the trust level of the end host. For example, some operations may be made best effort on the end host side (i.e., no trust is actually needed), while still benefiting the federated firewall system. Even if, for some end hosts 16, no trust can be established, federated firewalling may still be used to improve firewall performance. In this case, the federated firewall security system may not necessarily trust or rely on the end host's computations and still perform an entire set of pre-configured operations. If the end host can properly perform the requested actions, the work load on the firewall 12 can be significantly reduced. For example, the firewall 12 may push outbound ACL (Access Control List) rules to one or more end hosts 16. If the local host can intercept and block traffic that will be banned later by firewall, the firewall does not need to see and inspect that traffic.

In another example, the end host 16 may be allowed to upload its incoming blacklists and the firewall 12 configured to block all traffic to the device that is on the blacklist. This is relatively safe, as the host will discard the traffic anyway; therefore it makes sense for the firewall to directly throw it away without inspection. It may also be safe to push blacklists relevant to an end host 16, telling it not to send certain traffic. If the end host follows the blacklist and does not send the traffic, the firewall has less traffic to handle. If the end host 16 continues to send blacklisted traffic, then it may be assumed that it is a compromised host and appropriate action may be taken to contain or remove the threats on that device. Another example is per-host rate-limiting. If the local end host 16 can rate limit itself properly, the firewall 12 will only need to perform high level monitoring, which reduces the load on the firewall.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    receiving capability information from an end host at a centralized security matrix in communication with a firewall and a plurality of end hosts;
    verifying at the centralized security matrix, a trust level of the end host;
    assigning at the centralized security matrix, a firewall function to the end host based on said trust level and said capability information; and
    notifying the firewall of said firewall function assigned to the end host;
    wherein said assigned firewall functions are offloaded from the firewall to said plurality of end hosts by the centralized security matrix to enforce at optimum locations in a network and said firewall functions offloaded from the firewall are no longer performed at the firewall.

2. The method of claim 1 wherein said capability information identifies local security software installed at the end host and resource availability.

3. The method of claim 1 wherein verifying said trust level comprises validating software integrity at the end host.

4. The method of claim 1 wherein verifying said trust level comprises validating computing results at the end host.

5. The method of claim 1 wherein the centralized security matrix is located at the firewall.

6. The method of claim 1 wherein assigning said firewall function comprises offloading packet inspections from the firewall to the end host.

7. The method of claim 1 wherein assigning said firewall function comprises offloading traffic policing from the firewall to the end host.

8. The method of claim 1 further comprising updating security policies at a distributed database located at the firewall and said plurality of end hosts.

9. The method of claim 1 further comprising receiving security information at the centralized security matrix from the end host.

10. The method of claim 9 further comprising modifying access control policies based on said security information.

11. The method of claim 1 wherein the centralized security matrix, the firewall, and said plurality of end hosts form a federated firewall security system in communication via a plurality of agents installed at the centralized security matrix, the firewall, and said plurality of end hosts.

12. An apparatus comprising:
an interface for communication with a firewall and a plurality of end hosts;
a database for storing security policies at a centralized security matrix; and
a processor for processing capability information received from a plurality of end hosts at the centralized security matrix, verifying trust levels of said end hosts, assigning firewall functions to said end hosts based on said trust levels and said capability information, and notifying the firewall of said firewall functions assigned to said end hosts to offload said firewall functions from the firewall to said end hosts to enforce at optimum locations in a network;
wherein said firewall functions offloaded from the firewall are no longer performed at the firewall.

13. The apparatus of claim 12 wherein the database is part of a distributed database located at the firewall and said plurality of end hosts.

14. The apparatus of claim 12 wherein said capability information identifies local security software installed at said end hosts and resource availability.

15. The apparatus of claim 12 wherein the processor is further configured to receive inspection results from said plurality of end hosts and update access control policies at the database based on said inspection results.

16. The apparatus of claim 12 wherein the apparatus comprises the centralized security matrix and the firewall.

17. One or more non-transitory computer readable media storing logic on the one or more non-transitory computer readable media for execution and when executed operable to:
transmit capability information from an end host to a centralized security matrix in a federated firewall security system;
process instructions received from the centralized security matrix to perform a firewall function;
perform said assigned firewall function on network traffic received at the end host, wherein said firewall function is offloaded from a firewall in the federated firewall security system to the end host to enforce at optimum locations; and
transmit traffic inspection results from the end host to the centralized security matrix;
wherein said firewall functions offloaded from the firewall are no longer performed at the firewall.

18. The one or more non-transitory computer readable media of claim 17 wherein said capability information is transmitted from an agent installed at the end host to another agent installed at the centralized security matrix.

19. The one or more non-transitory computer readable media of claim 17 wherein said capability information identifies local security software installed at the end host and resource availability.

20. The one or more non-transitory computer readable media of claim 17 wherein said firewall function is based on a policy stored in a distributed database.

* * * * *